US006187397B1

(12) United States Patent
Grangette

(10) Patent No.: US 6,187,397 B1
(45) Date of Patent: Feb. 13, 2001

(54) HEAT-SHRINKABLE POLYETHYLENE FILM OF HIGH CLARITY FOR THE WRAPPING OF GROUPS OF PRODUCTS

(75) Inventor: Michel Grangette, Versailles (FR)

(73) Assignee: Societe de Conditionnement et Industrie Societe Anonyme Ceisa, Bernay (FR)

( * ) Notice: Under 35 U.S.C. 154(b), the term of this patent shall be extended for 0 days.

(21) Appl. No.: 09/291,124

(22) Filed: Apr. 14, 1999

(30) Foreign Application Priority Data

Apr. 15, 1998 (FR) .................................................. 98 04690

(51) Int. Cl.$^7$ ................................ B32B 53/00; C08F 8/00
(52) U.S. Cl. ...................... 428/34.9; 428/35.2; 428/35.7; 428/213; 428/218; 428/220; 428/515; 428/519; 428/521; 525/59; 525/191; 525/240
(58) Field of Search ..................................... 428/213, 218, 428/220, 515, 519, 521, 34.9, 35.2, 35.7; 525/59, 191, 240

(56) References Cited

U.S. PATENT DOCUMENTS

| 4,194,039 | * | 3/1980 | Mueller | 428/213 |
|---|---|---|---|---|
| 4,532,189 | * | 7/1985 | Mueller | 428/516 |
| 4,551,380 | * | 11/1985 | Schoenberg | 428/218 |
| 4,590,124 | * | 5/1986 | Schoenberg | 428/339 |
| 4,865,902 | * | 9/1989 | Golike et al. | 428/215 |
| 5,032,463 | | 7/1991 | Smith | 428/520 |
| 5,128,212 | * | 7/1992 | Kneale et al. | 428/516 |
| 5,427,807 | * | 6/1995 | Chum et al. | 426/393 |
| 5,562,958 | * | 10/1996 | Walton et al. | 428/34.9 |
| 5,595,705 | * | 1/1997 | Walton et al. | 264/456 |
| 5,614,315 | * | 3/1997 | Kondo et al. | 428/332 |
| 5,888,660 | * | 3/1999 | Landoni et al. | 428/516 |

FOREIGN PATENT DOCUMENTS

WO94/09060    4/1994  (WO) .

* cited by examiner

Primary Examiner—Samuel A. Acquah
(74) Attorney, Agent, or Firm—O'Keefe, Egan & Peterman

(57) ABSTRACT

The film comprises a central layer, composed of a mixture of radical low density polyethylene and of conventional linear polyethylene, sandwiched between two outer layers comprising at least 50% by weight of conventional linear polyethylene, with a relative density of 0.918–0.930, which are devoid of metallocene linear polyethylene, each of the outer layers having a thickness representing 5 to 25% of the total thickness of the film.

8 Claims, No Drawings

HEAT-SHRINKABLE POLYETHYLENE FILM OF HIGH CLARITY FOR THE WRAPPING OF GROUPS OF PRODUCTS

The present invention generally relates to heat-shrinkable polyethylene films for the wrapping of groups of products, such as bottles, for example of mineral water or of fruit juice, metal cans, for example beer cans or cans of other drinks, or cartons, for example of milk or of other drinks, and more particularly heat-shrinkable polyethylene films of high clarity.

Heat-shrinkable polyethylene wrapping films are conventionally produced by monoextrusion or coextrusion by means of an extrusion-blow molding machine. The polyethylene film is extruded in an annular die and is swollen in order to form a polyethylene bubble which is subsequently flattened in order to be wound-up.

The film thus obtained is subsequently used to wrap groups of products. The film is then positioned around the group of products to be wrapped and the assembly is subsequently placed in an oven at an appropriate temperature for the film to shrink around the products of the group in order to grip it and to give it cohesion.

Current so-called "high clarity" heat-shrinkable polyethylene films are obtained by coextrusion of three layers. More specifically, "high clarity" polyethylene films comprise a central layer, composed predominantly of radical polyethylene with a relative density of 0.918–0.930, sandwiched between two, very glossy, special polyethylene layers composed predominantly of linear polyethylene, obtained by metallocene synthesis (metallocene linear polyethylene), with a relative density of 0.918–0.927.

The central layer can optionally comprise high density polyethylene in order to confer a degree of stiffness on the film.

The glossy outer layers of "high clarity" films generally comprise from 80 to 90% by weight, ideally 90% by weight, with respect to the total weight of the mixture, of metallocene linear polyethylene and the central layer generally comprises more than 50% by weight, with respect to the total weight of the polymers, of standard radical polyethylene.

The outer layers of conventional "high clarity" polyethylene films have a thickness representing approximately 30% of the thickness of the film.

Metallocene linear polyethylenes are expensive products of low relative density and high flexibility.

Thus, in the majority of cases, it is necessary to incorporate high density polyethylene in the central layer of the film in order to obtain a film which is sufficiently stiff.

The subject-matter of the present invention is therefore a high clarity heat-shrinkable polyethylene film which does not require the use of metallocene linear polyethylene or of high density polyethylene and which exhibits a clarity comparable with or even superior to that of conventional high clarity films and a better stiffness than the films of the prior art.

The "high clarity" heat-shrinkable film according to the invention comprises a central layer sandwiched between two outer layers, the central layer being composed of a mixture of radical low density polyethylene (radical LDPE) and of conventional linear polyethylene (conventional linear PE), with a relative density of between 0.922 and 0.930, preferably 0.925–0930, wherein the outer layers comprise at least 50% by weight, with respect to the total weight of the polymers of the layer, of conventional linear polyethylene with a relative density of between 0.918 and 0.930, preferably 0.925–0.927, and are devoid of any metallocene linear polyethylene and wherein these outer layers have a thickness representing 5 to 25%, preferably 5 to 15% and better still of the order of 10% of the total thickness of the film.

Preferably, in the central layer, the radical low density polyethylene represents more than 50% by weight of the mixture and the central layer does not comprise high density polyethylene.

The outer layers can be identical or different in composition and identical or different in thickness but preferably have the same composition and the same thickness.

As indicated above, the outer layers comprise conventional linear polyethylene with a relative density of 0.922–0.930 and are devoid of metallocene linear polyethylene. The conventional linear polyethylenes are well known products which are commercially available. The conventional linear PE represents from 50 to 100% by weight of the mixture constituting the outer layers, preferably 50 to 90% and better still of the order of 80% by weight, the remainder being radical low density polyethylene.

The conventional linear polyethylenes preferred according to the invention are linear polyethylenes comprising, as comonomer, 1-butene, 1-hexene and 1-octene and in particular 1-butene.

As is well known, these linear polyethylenes are manufactured by polymerization in the gas phase in the presence of a catalyst of Ziegler type.

As is well known, the mixtures constituting the various layers can comprise, in the usual proportions, any adjuvant conventionally used, such as, for example, processing aids (fluorinated elastomers at a level greater than 100 ppm, generally of the order of 500 ppm), antistatic agents and slip agents.

Processing aids are ingredients which are well known in the technology of polyethylenes and which have the aim of facilitating extrusion of linear polyethylenes and of preventing the orange peel phenomenon by smoothing the surface of the film.

Slip agents are also conventional ingredients which have the aim of lowering the coefficient of friction of the film. Mention may be made, among these slip agents, of erucamides.

Mention may be made, among antistatic agents, of ethoxylated amines.

As indicated above, the outer layers have a thickness representing 5 to 25%, preferably 5 to 15% and generally of the order of 10% of the total thickness of the film. The films according to the invention generally have a total thickness of between 20 and 100 μm.

The films according to the invention are obtained by coextrusion.

EXAMPLE

A heat-shrinkable polyethylene film according to the invention with a thickness of 50 μm, which has the structure and the composition indicated below, was manufactured by coextrusion.

| | Composition, % by weight | |
|---|---|---|
| | Central layer | Outer layers |
| Radical polyethylene (d = 0.928) | 80 | 18 |
| Conventional linear | 20 | 80 |

-continued

|  | Composition, % by weight | |
| --- | --- | --- |
|  | Central layer | Outer layers |
| polyethylene (Butene – d = 0.927) | | |
| Processing aid (5% masterbatch) | | 1% |
| Antistatic agent (5% masterbatch) | | 1% |

Relative thicknesses of the layers, with respect to the total thickness of the film.

10%/80%/10%

The gloss at 20° of the film obtained was measured according to DIN Standard 67530 and the haze was measured according to ASTM Standard D1003.

The results are given below.

It will be recalled that a film is regarded as being of "high clarity" if the gloss measured is greater than 90% and the haze less than 2%.

Gloss at 20°: 108%

Haze: 1.3% (Illuminant D65)

In addition, the film obtained exhibits excellent stiffness for application in wrapping.

What is claimed is:

1. A high clarity heat-shrinkable film comprising a central layer, composed of a mixture of radical low density polyethylene and of conventional linear polyethylene with a relative density of between 0.922 and 0.930, sandwiched between two outer layers, wherein each of the outer layers comprises at least 50% by weight, with respect to the total weight of the polymers present in the layer, of conventional linear polyethylene with a relative density of between 0.918 and 0.930 and is devoid of any metallocene linear polyethylene, each of the outer layers having a thickness representing from 5 to 25% of the total thickness of the film.

2. A film as claimed in claim 1, wherein the conventional polyethylene has a relative density of between 0.925 and 0.927.

3. A film as claimed in claim 1, wherein the outer layers comprise from 50 to 100% by weight of conventional linear polyethylene.

4. A film as claimed in claim 3, wherein the outer layers comprise 80% by weight of conventional linear polyethylene, the remainder being radical low density polyethylene.

5. A film as claimed in claim 1, wherein the central layer does not comprise high density polyethylene.

6. A film as claimed in claim 1, wherein each of the outer layers has a thickness representing from 5 to 15% of the total thickness of the film.

7. A film as claimed in claim 6, wherein the outer layers have a thickness representing 10% of the total thickness of the film.

8. A group of products wrapped by means of a heat-shrunken film, the film being as defined in claim 1.

* * * * *